United States Patent
Murakawa

[11] Patent Number: 5,782,312
[45] Date of Patent: Jul. 21, 1998

[54] ENGINE HOOD

[75] Inventor: Masatake Murakawa, Sakai, Japan

[73] Assignee: Kubota Corporation, Japan

[21] Appl. No.: 220,006

[22] Filed: Mar. 30, 1994

[30] Foreign Application Priority Data

Sep. 30, 1993 [JP] Japan ................................. 5-244043
Dec. 9, 1993 [JP] Japan ................................. 5-308794

[51] Int. Cl.[6] ................................................ B62D 25/10
[52] U.S. Cl. .................. 180/69.2; 180/68.1; 180/69.24; D15/15
[58] Field of Search ..................... 180/68.1, 69.21, 180/69.24, 68.2; D15/15, 23; 296/193, 196

[56] References Cited

U.S. PATENT DOCUMENTS

| | | | |
|---|---|---|---|
| D. 256,017 | 7/1980 | Emundts et al. | D15/23 |
| D. 306,301 | 2/1990 | Funabashi et al. | D15/23 |
| D. 311,008 | 10/1990 | Durfee et al. | D15/15 |
| 2,235,496 | 3/1941 | Greig | 180/69.21 |
| 3,805,909 | 4/1974 | Koeppen | 180/69.21 |
| 3,970,164 | 7/1976 | Suzuki | 180/69.21 X |
| 4,270,623 | 6/1981 | Brandl et al. | 180/69.2 |
| 4,432,309 | 2/1984 | Hutchinson et al. | |
| 4,437,529 | 3/1984 | Fralish | 180/69.2 |
| 4,572,312 | 2/1986 | France et al. | 180/69.21 |
| 5,136,752 | 8/1992 | Bening et al. | 180/69.21 X |
| 5,193,636 | 3/1993 | Holm | |
| 5,207,187 | 5/1993 | Kurohara et al. | |

FOREIGN PATENT DOCUMENTS

| | | |
|---|---|---|
| 63-15280 | 2/1988 | Japan |
| 4-311666 | 11/1992 | Japan |

*Primary Examiner*—Brian L. Johnson
*Assistant Examiner*—Michael Mar
*Attorney, Agent, or Firm*—Webb Ziesenheim Bruening Logsdon Orkin & Hanson, P.C.

[57] ABSTRACT

An engine enclosure for use on a vehicle having an engine disposed forwardly of a driver's seat. This engine enclosure has a control panel disposed rearwardly of the engine, and a hood disposed forwardly of the control panel for covering the engine. The hood includes a lower hood attached to vehicle frames through a fixing device, and an upper hood pivotable about a pivotal support disposed adjacent a forward end thereof so as to surround upper edges of the lower hood. The lower hood has a lower front wall portion, and lower side wall portions extending upward and opposed to each other across the engine. The lower side wall portions have a smaller distance therebetween in a lower region than in an intermediate region. The upper hood has a top wall portion, an upper front wall portion and upper side wall portions. The upper side wall portions have a greater distance therebetween in a lower region than in an intermediate region.

13 Claims, 12 Drawing Sheets

F I G .13
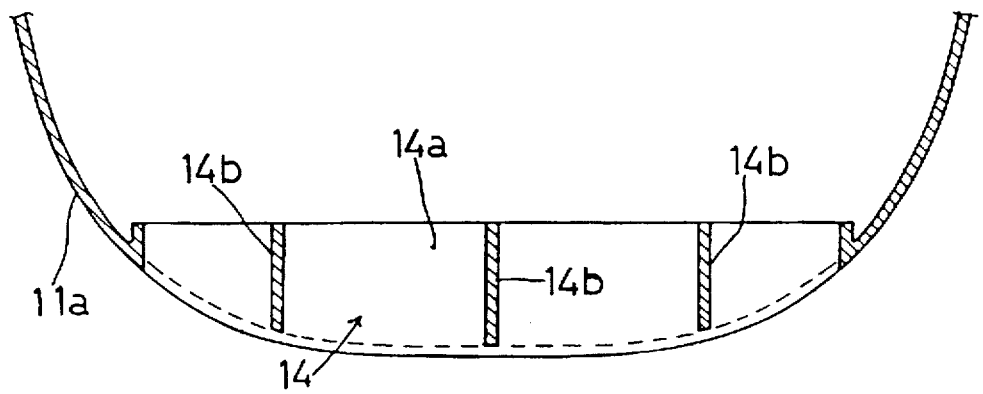
F I G .14
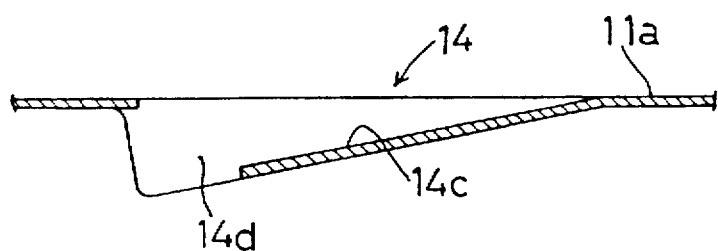
F I G .15
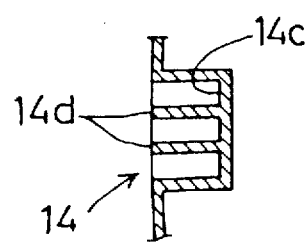

ENGINE HOOD

BACKGROUND OF THE INVENTION

1. Field of the Invention

The present invention relates to an enclosure for covering an engine room of a lawn tractor or the like.

2. Description of the Related Art

Many lawn tractors have an engine mounted on a front portion of a chassis, a driver's seat disposed in a rear region of the chassis, and a mower unit disposed between front and rear wheels. Typical engine hood structures are disclosed in Japanese Utility Model Publication Kokai No. 63-15280 and Japanese Patent Publication Kokai No. 4-501666. In each case, a control panel is disposed forwardly of the driver's seat to form a rear part of an engine room, and an engine hood is disposed forwardly of the control panel. The hood includes right and left side walls, a front wall and an upper wall formed integral with one another. The integrated hood is pivotally connected to a chassis frame to be vertically swingable, to be opened and closed, about a pivotal axis located in a lower front position of the hood.

In the above engine hood structure, the hood must have a lower end dimensioned to lie outwardly of various devices arranged in the engine room, so that the hood may be vertically swung with the lower end moving clear of those devices. Consequently, the hood has a large width in a lower portion thereof. This hood tends to present a stocky outward appearance, such as that of an agricultural tractor hood. Such outward appearance is not necessarily appropriate to a lawn tractor intended for ordinary household use or for use on a golf course or the like, for which lightness is a desired feature.

The large and heavy hood entirely covering the engine room must be opened and closed when the user carries out a simple maintenance operation such as refilling engine oil, changing plugs (in the case of a gasoline engine) or filling up the radiator with water (in the case of a water-cooled engine). Thus, there is room for improvement in handling facility also.

SUMMARY OF THE INVENTION

A primary object of the present invention is to provide an engine enclosure having a hood easy to open and close and presenting an excellent outward appearance, with an improved hood structure and configuration, in order to overcome the disadvantages of the large hood entirely covering the engine room.

Another object of the present invention is to allow the engine room to be fully opened as necessary, for enabling a major maintenance operation, for example.

A further object of the present invention is to facilitate air circulation in an engine room defined by an engine enclosure.

The above objects are fulfilled, according to the present invention, by an engine enclosure for use on a vehicle having an engine disposed forwardly of a driver's seat, comprising:

a control panel disposed rearwardly of the engine; and hood means disposed forwardly of the control panel for covering the engine, the hood means including:

a lower hood attached to vehicle frames through fixing means, and having a lower front wall portion, and lower side wall portions extending upward and opposed to each other across the engine, the lower side wall portions having a smaller distance therebetween in a lower region than in at least an intermediate region; and an upper hood pivotable about pivot means disposed adjacent a forward end thereof so as to surround upper edges of the lower hood, the upper hood including a top wall portion, an upper front wall portion and upper side wall portions, the upper side wall portions having a greater distance therebetween in a lower region than in at least an intermediate region.

The engine enclosure having the above construction, as a whole, is shaped to bulge, with the right and left side walls swelling outward in vertically intermediate regions thereof. This engine enclosure provides a large engine room while presenting an excellent outward appearance of design with a neatly constructed, lower hood portion.

The upper hood covering only an upper region of the engine room is relatively light. The user opens the light-weight upper hood when carrying out a simple maintenance operation such as refilling engine oil, changing plugs or filling up the radiator with water.

In a preferred embodiment of the present invention, the fixing means of the lower hood includes a front fixator and a rear fixator for removably fixing the lower hood to the vehicle frames, the front fixator being attached to a support member erected on front portions of the vehicle frames, the rear fixator being provided on the control panel.

With this construction, when a major maintenance operation is required, such as servicing of a lower portion of the engine room or removal of the engine, the lower hood may be drawn forward and removed after disconnecting the lower hood from the front support member and from the control panel. In this way, the engine room may be fully opened with ease.

Further, upper edges of the lower hood and lower edges of the upper hood may be dimensioned such that air passages are formed between at least portions of the lower edges of the upper hood and upper edges of the lower hood when the upper hood is pivoted to a position covering the upper edges of the lower hood. Then, the engine room defined by the engine enclosure according to the present invention has an excellent air circulation feature.

To further promote air circulation in the engine room defined by the engine enclosure according to the present invention, partition means is provided for dividing the engine room defined by the control panel and the hood means, into an engine accommodating region and an air intake region. This partition means includes:

an upper wall portion opposed to an upper surface of the engine and defining an opening for communicating a cooling air suction opening of the engine with the air intake region; and a vertical wall portion extending upward from the upper wall portion, the vertical wall portion having an upper end for contacting the upper hood pivoted to cover the engine.

Further, engaging means is provided on the side wall portions, respectively, and engageable means is provided in side edges of the upper wall portion to be engageable with the engaging means, wherein the engaging means and the engageable means are engaged through pressure contact between the upper hood pivoted to a position covering the engine and the upper wall portion.

Thus, the partition wall may be fixed to the hood simply by assembling the upper hood to the lower hood, with the engaging means and engageable means vertically engaged with each other to have the transversely opposite ends of the upper wall portion supported by the lower hood. In this way, the partition wall may be assembled to the hood with ease. For maintenance of the engine or the like, the engaging means and engageable means are disengaged simply by detaching the upper hood from the lower hood and pulling the partition wall upward. Thus, the partition wall may be separated from the lower hood with ease. Attachment and detachment of the partition wall to/from the hood are carried out easily.

Other features and advantages of the present invention will be apparent from the following description of the preferred embodiments taken in conjunction with the drawings.

BRIEF DESCRIPTION OF THE DRAWINGS

FIG. 13 is a sectional view of air intake openings in the different embodiment.

FIG. 14 is a sectional view of the air intake openings in the different embodiment.

FIG. 15 is a sectional view of the air intake openings in the different embodiment.

DETAILED DESCRIPTION OF THE PREFERRED EMBODIMENTS

An embodiment of the present invention will be described with reference to the drawings, in which an enclosure according to the invention is employed on a mid-mount type riding lawn mower.

Figure 1:
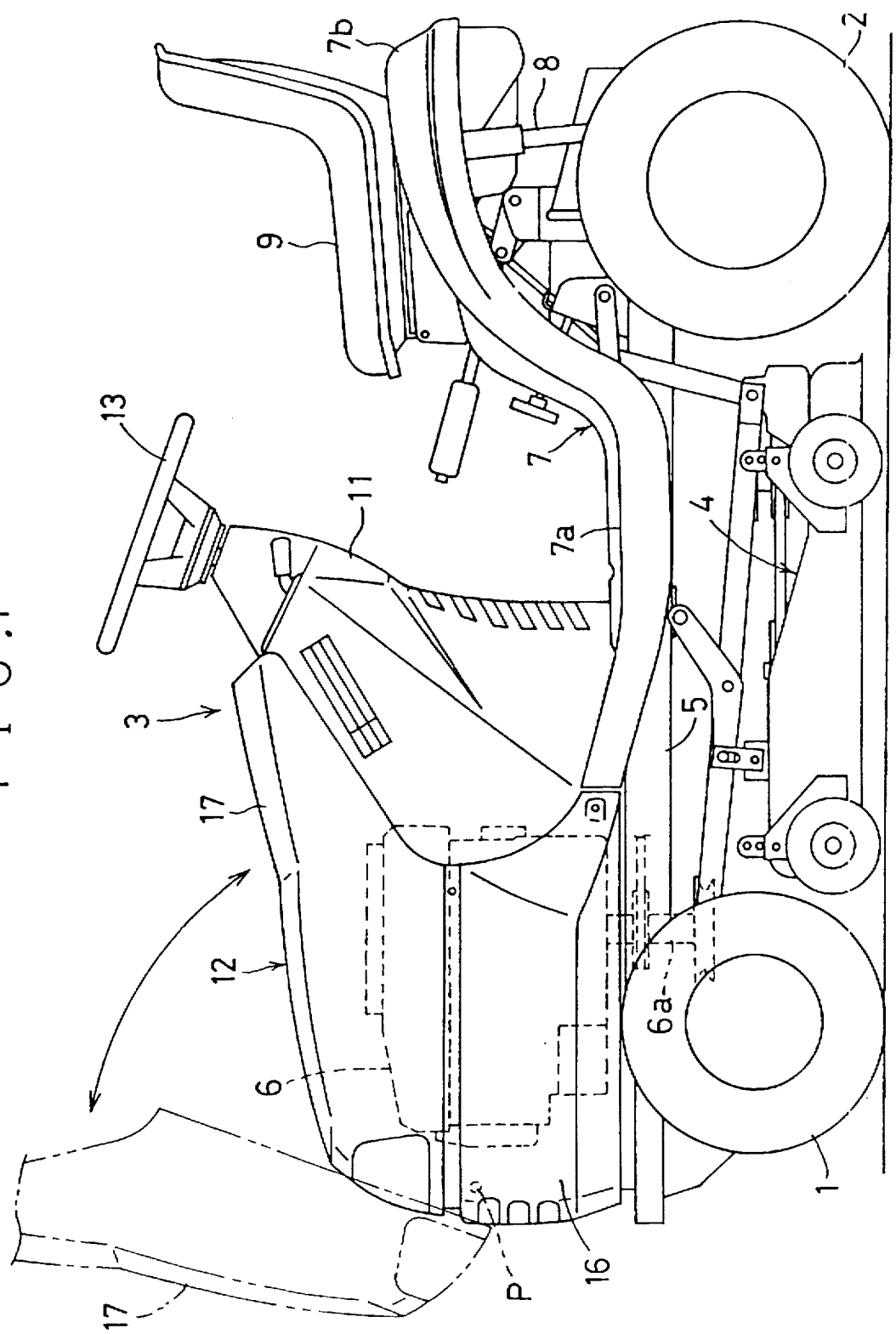
FIG. 1 is a side elevation of a riding lawn mower.
Figure 2:
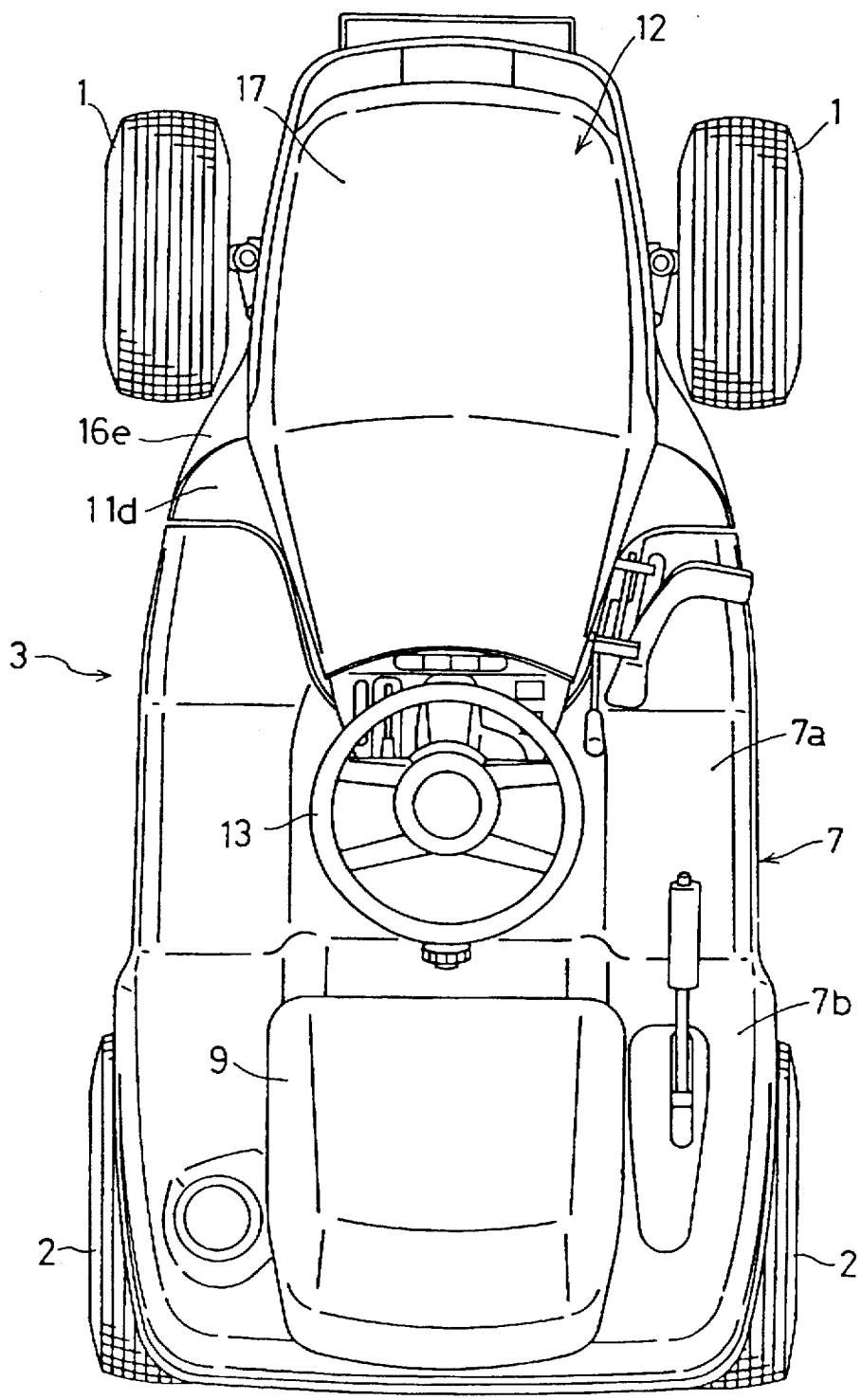
FIG. 2 is a plan view of the riding lawn mower.

As shown in FIGS. 1 and 2, the mid-mount type riding lawn mower is a four-wheel vehicle having dirigible front wheels 1, rear drive wheels 2, a vehicle body 3, and a mower unit 4 suspended from the vehicle body 3 between the front and rear wheels 1 and 2. The vehicle body 3 includes a pair of right and left chassis frames 5, with an air-cooled engine 6 mounted on a front portion of the frames 5. A fender member 7 extends from a longitudinally intermediate region to a rear region of the frames 5 and connected thereto through a suspension mechanism 8. The fender member 7 includes a step portion 7a and rear fender portions 7b formed integral with one another. A driver's seat 9 is disposed in a transversely middle position between the rear fender portions 7b to be adjustable in fore and aft directions.

The engine 6 is the vertical type having a downwardly extending output shaft 6a operatively connected through a belt to a rear wheel driving transmission, not shown, disposed in a rear position of the vehicle body. The output shaft 6a is operatively connected also to the mower unit 4 through a belt.

The engine 6 is housed in an engine room defined by an engine enclosure. The engine enclosure is formed of a control panel 11 erected on the chassis frames 5 forwardly of the driver's seat 9, and a hood 12 disposed forwardly of the control panel 11.

Figure 3:
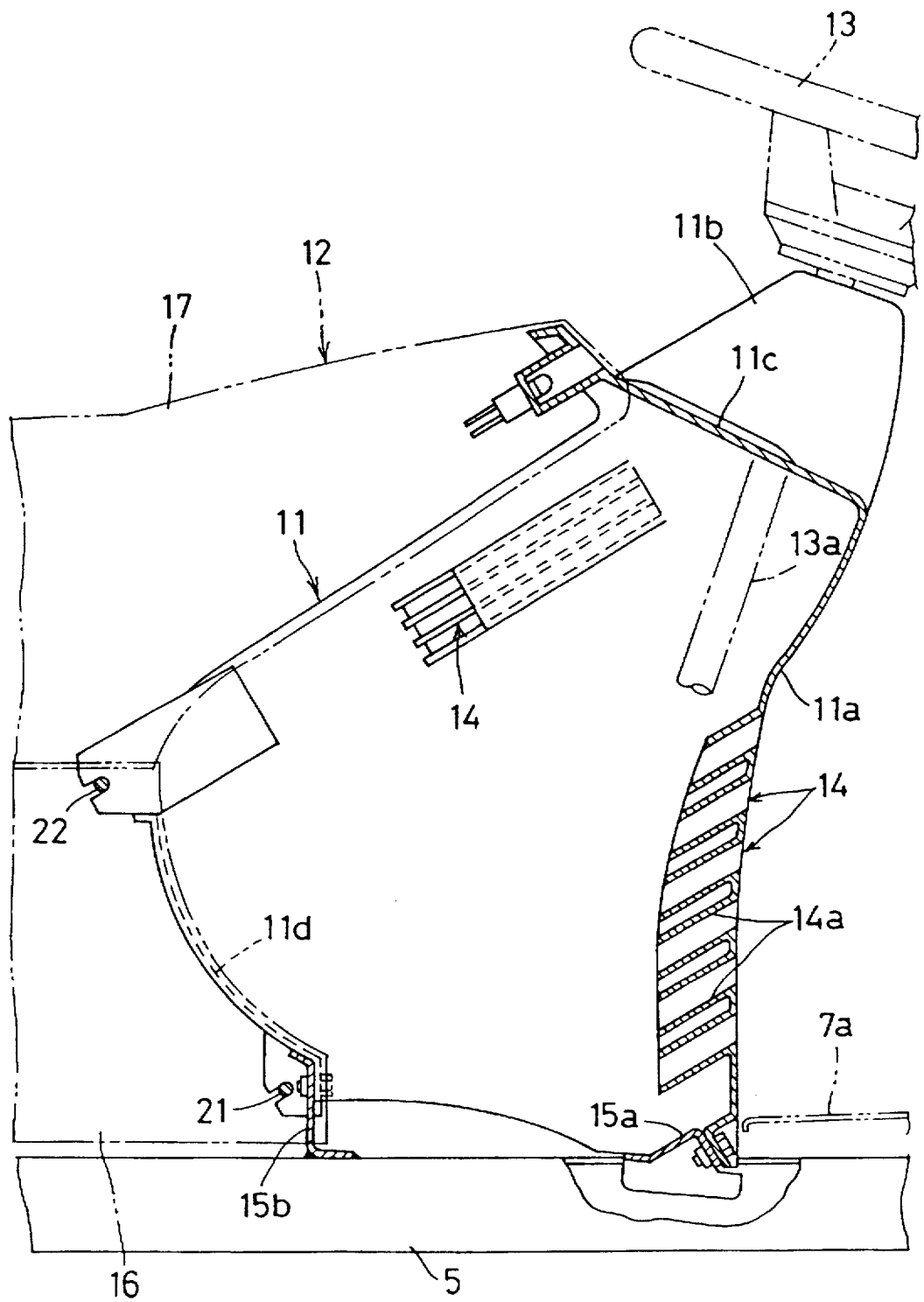
FIG. 3 is a side view in vertical section of a rear portion of an engine room.
Figure 4:
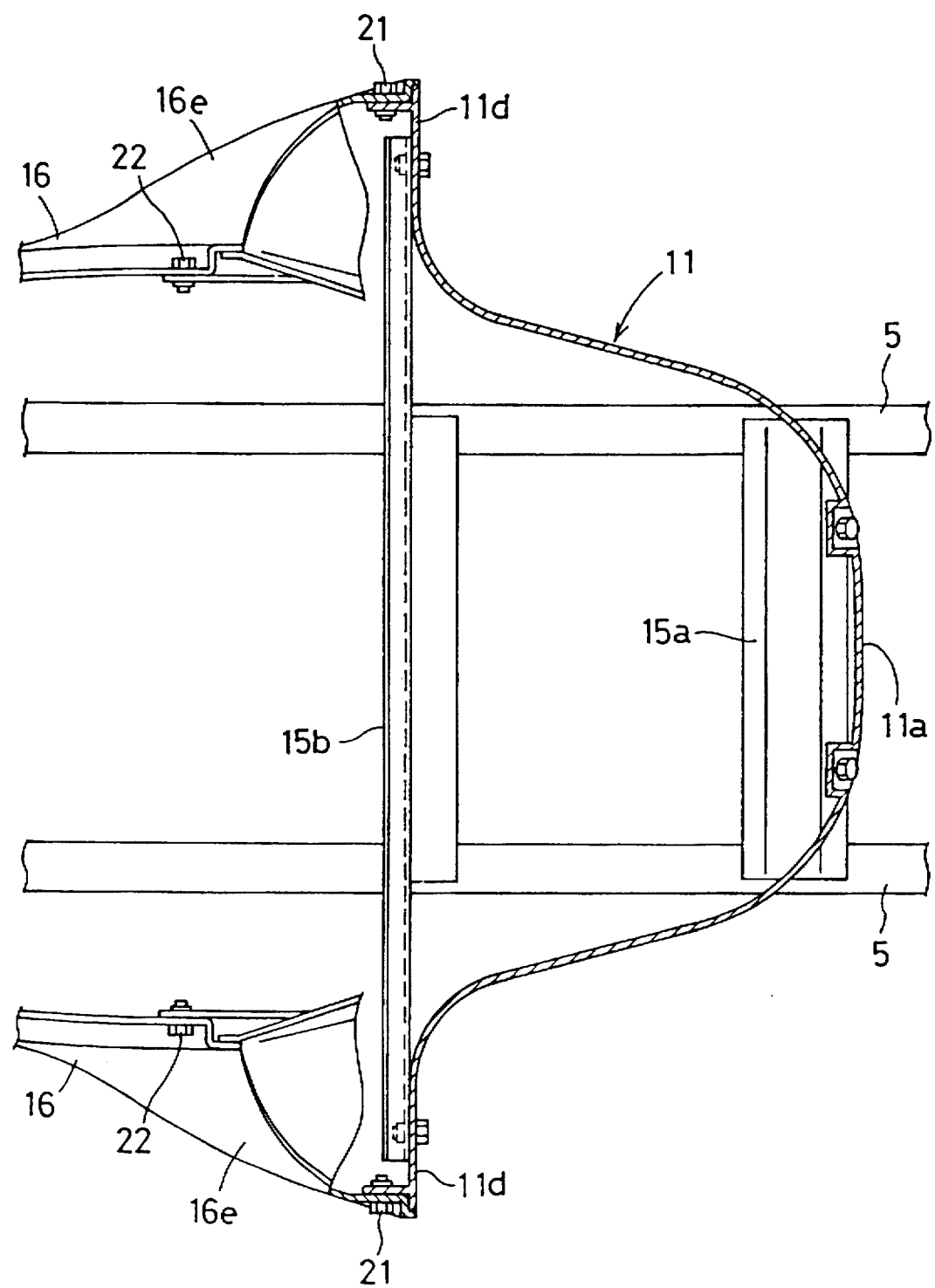
FIG. 4 is a plan view in cross section of the rear portion of the engine room.
Figure 5:
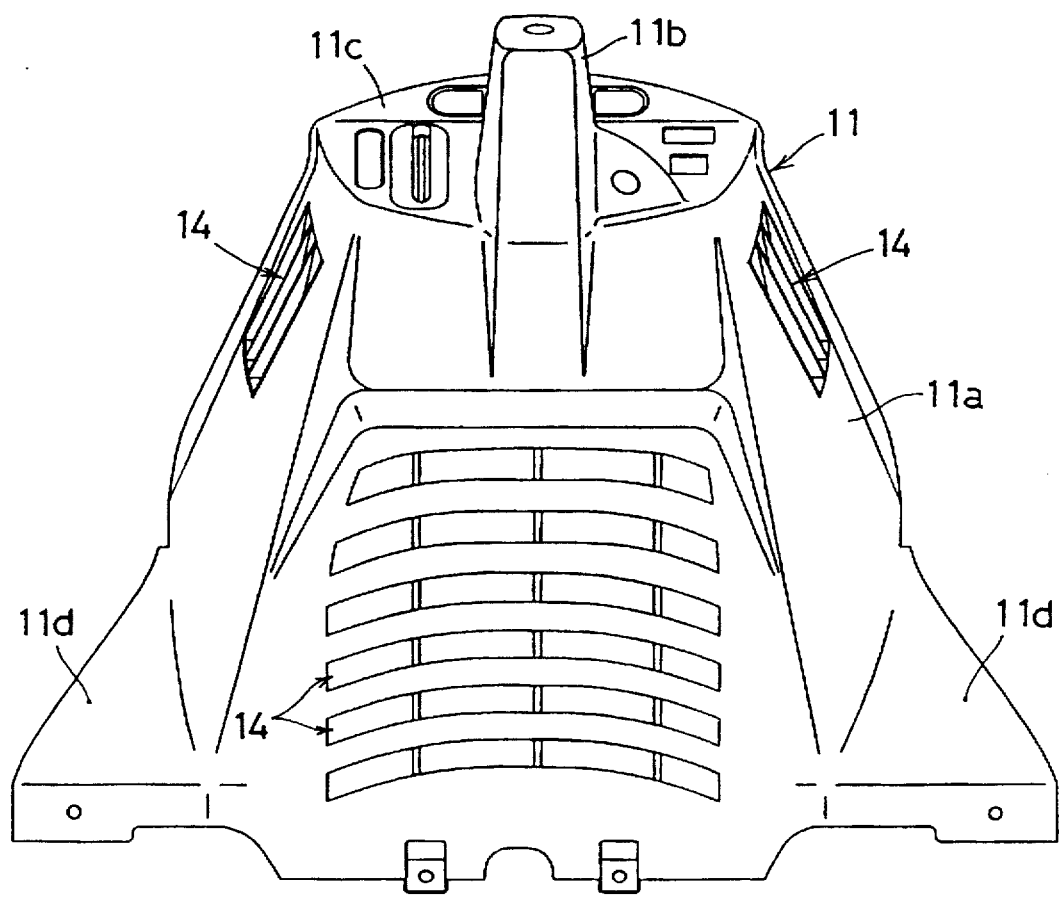
FIG. 5 is a rear view of a control panel.
Figure 6:
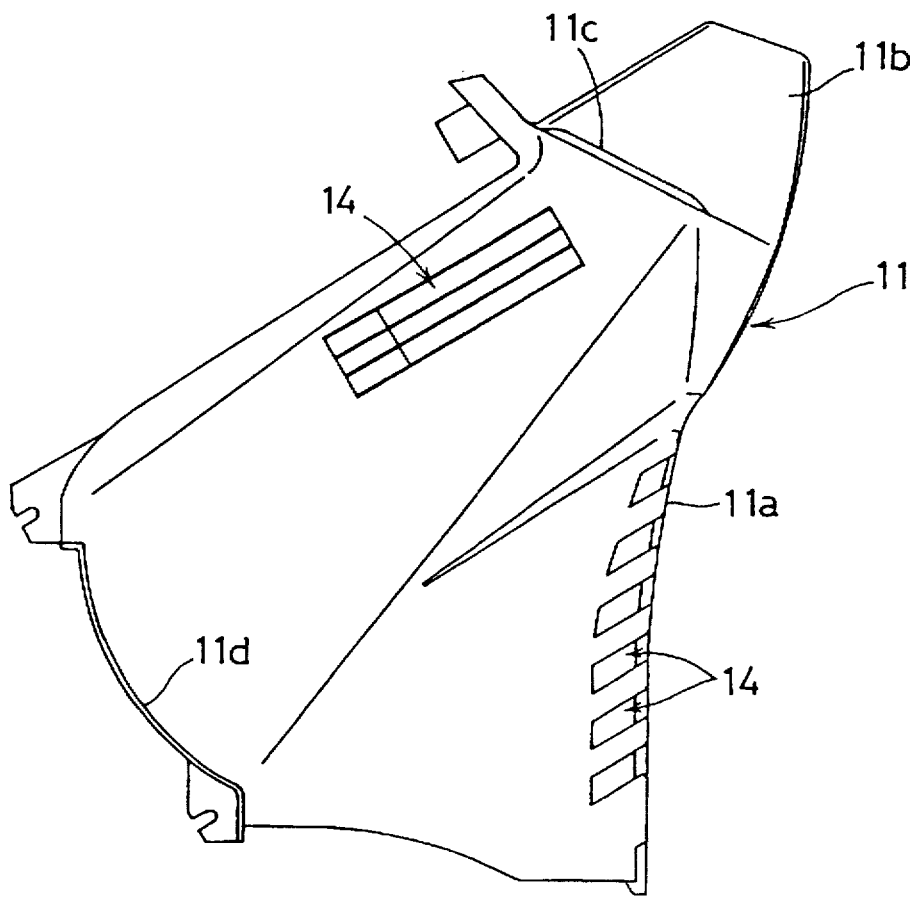
FIG. 6 is a side view of the control panel.
Figure 7:
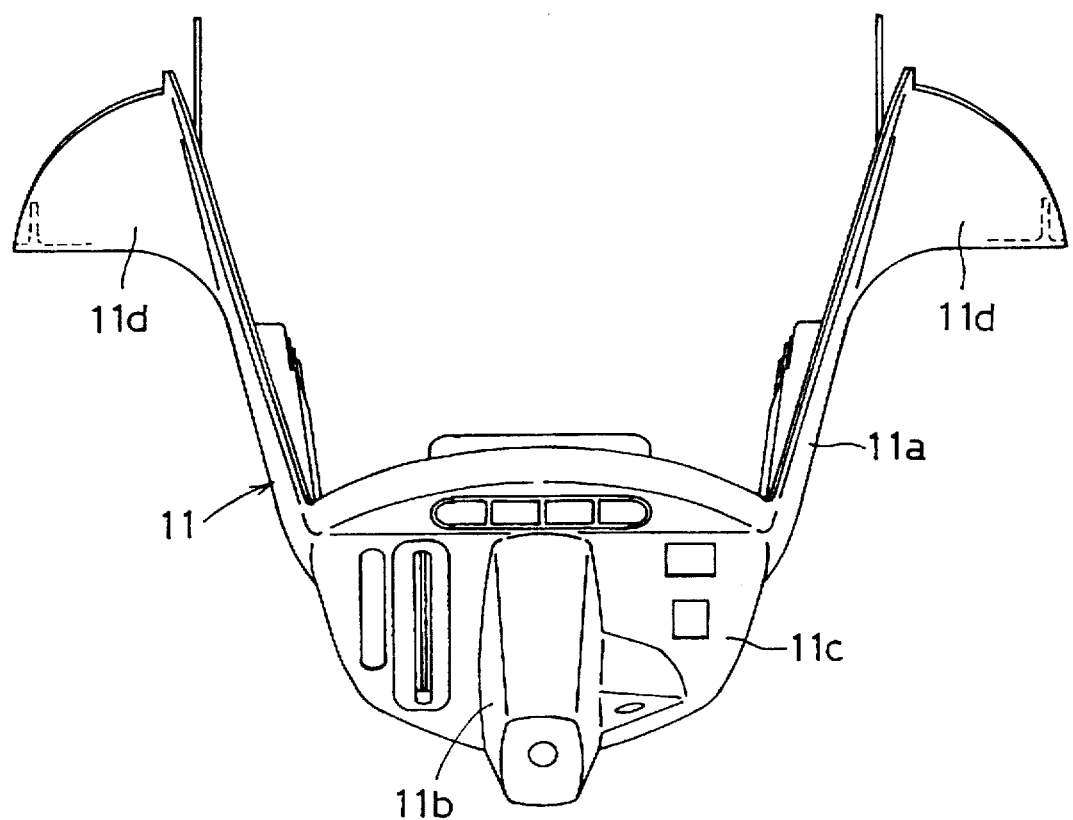
FIG. 7 is a plan view of the control panel.

As shown in FIG. 3, the control panel 11 includes a panel body 11a, a bulged portion 11b penetrated by a steering column 13a of a steering wheel 13, and an instrument panel 11c, formed integral with one another by plastic molding. The panel body 11a has slits 14 formed in a front surface and right and left side surfaces thereof for drawing in engine cooling air. Inclined guides 14a are provided particularly for the slits 14 formed in the front surface to guide cooling air forwardly and downwardly. The panel body 11a includes right and left lower ends extending outwardly and bolted to a stay 15a secured to the chassis frames 5. As shown in FIGS. 4 through 7, the panel body 11a further includes flange portions 11d formed in lower right and left positions and extending forwardly and upwardly to be continuous with right and left forward ends of the step portion 7a of the fender member 7 to provide foot rests. As seen from FIG. 4, the right and left flange portions 11d also are bolted to right and left extensions of a stay 15b bridging the chassis frames 5.

Figure 8:
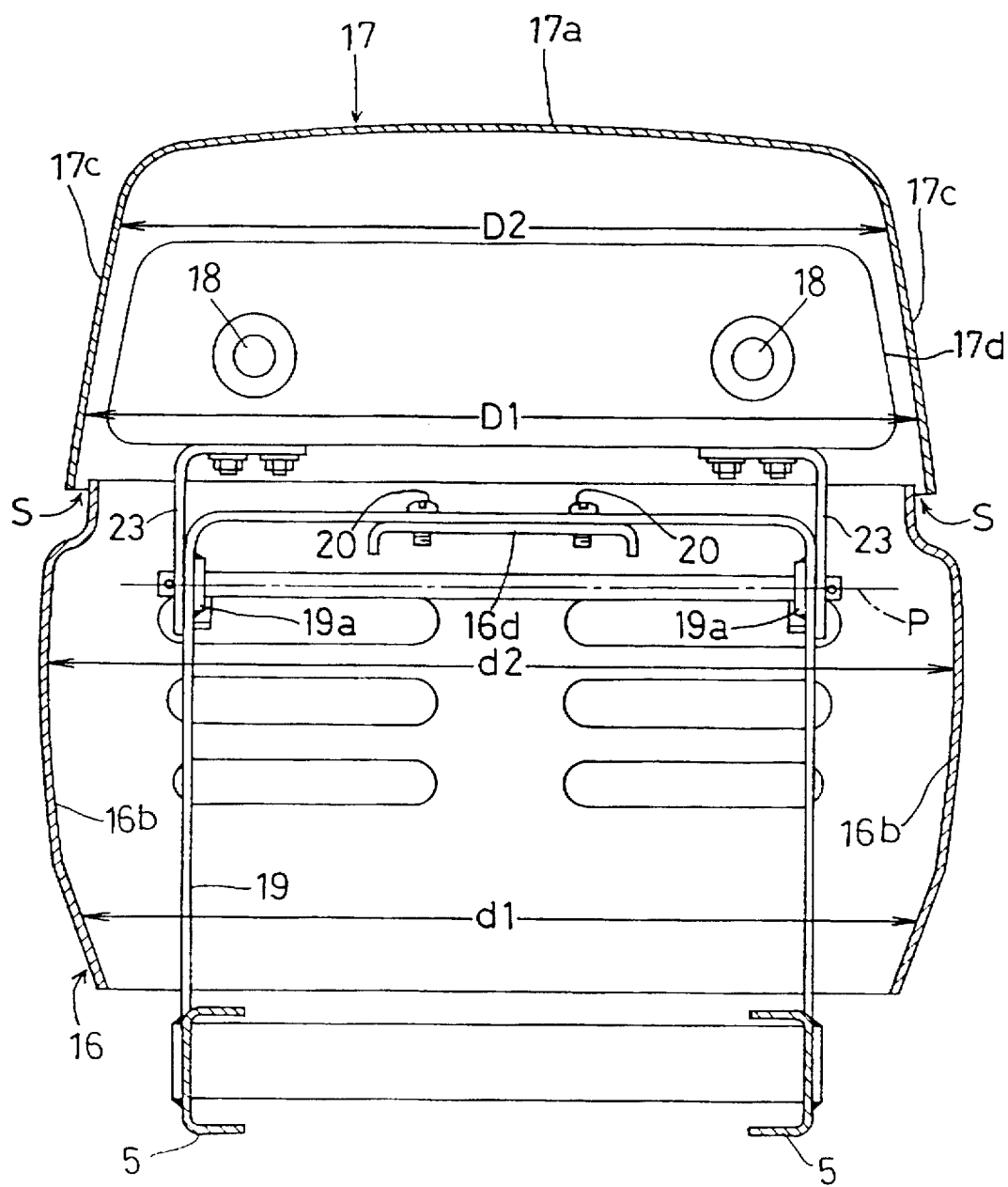
FIG. 8 is a rear view in vertical section of a front portion of a hood.
Figure 9:
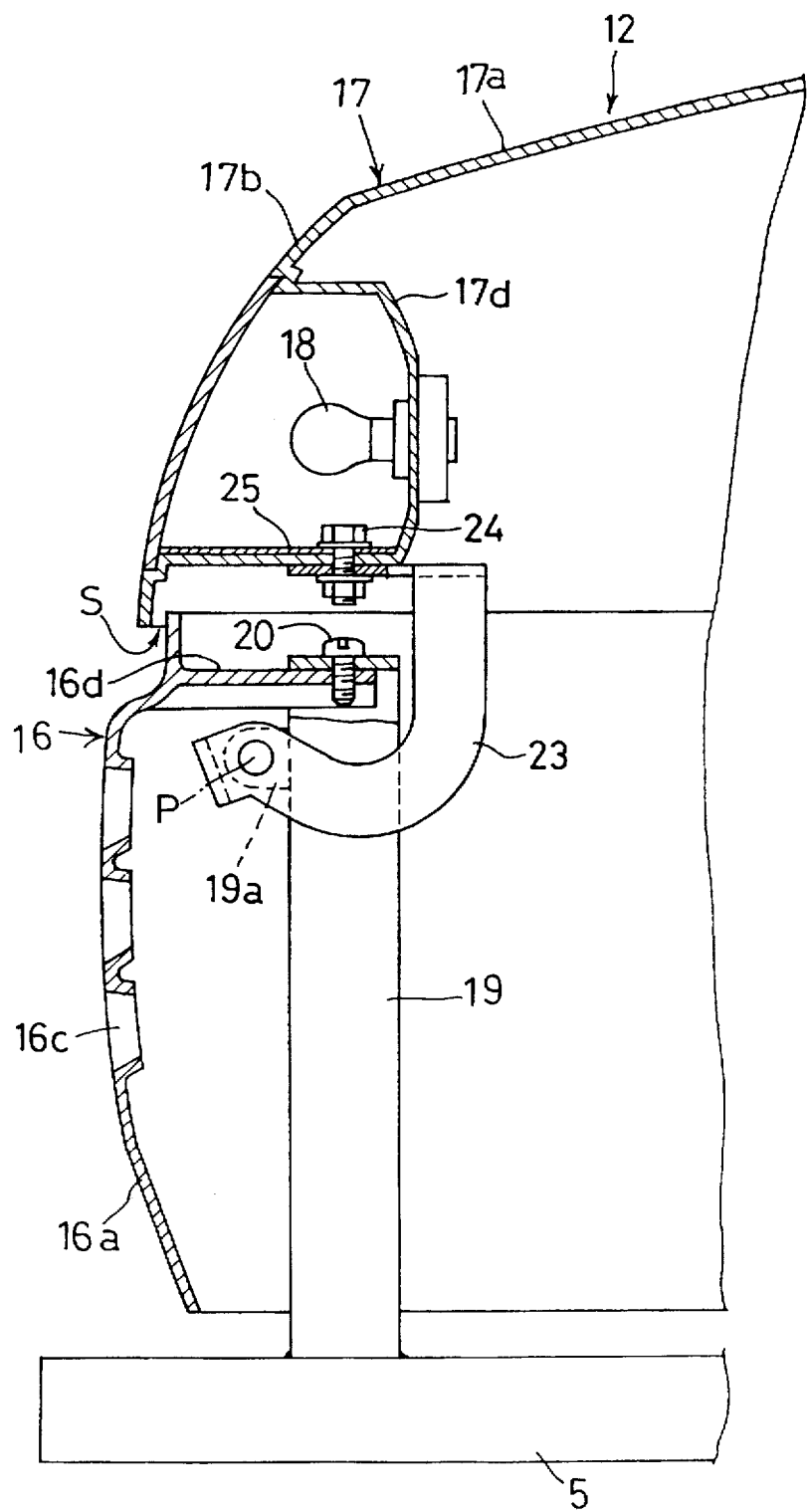
FIG. 9 is a side view in vertical section of the front portion of the hood.

As shown in FIG. 8, the hood 12 includes a lower hood 16 and an upper hood 17 formed by plastic molding. The lower hood 16 includes a front wall 16a and right and left side walls 16b. As shown in FIG. 9, the front wall 16a defines a ventilating grille 16c. The upper hood 17 includes an upper wall 17a, a front wall 17b and right and left side walls 17c. The front wall 17b supports headlights 18. As seen from FIG. 8, the right and left side walls 16b of the lower hood 16 are shaped and arranged such that a distance d1 therebetween in a lower region is smaller than a distance d2 in an intermediate region. Further, the right and left side walls 17c of the upper hood 17 are shaped and arranged such that a distance D1 therebetween in a lower region is greater than a distance D2 in an intermediate region. Thus, the lower hood 16 has downwardly diminishing cross sections, while the upper hood 17 has upwardly diminishing cross sections.

As seen from FIGS. 8 and 9, the lower hood 16 includes a coupling portion 16d extending from the front wall 16a and connected by bolts 20 to a top portion of an arch-like support 19 erected on front positions of the chassis frames 5. As seen from FIG. 4, the lower hood 16 has lower rear ends 16e extending outwardly to be continuous with the right and left lower flange portions 11d of the control panel 11. The lower rear ends 16e of the lower hood 16 are detachably connected by bolts 21 from opposite sides to the flange portions of the control panel 11, respectively. Further, the lower hood 16 is detachably connected at right and left upper ends thereof to the control panel 11 by bolts 22, respectively.

The upper hood 17 includes a headlight box 17d in a front position thereof, and a pair of right and left hinges 23 are connected to a bottom of the headlight box 17d by bolts 24. The hinges 23 have free ends thereof pivotally connected to mounting lugs 19a secured to right and left upper positions of the support 19, to be vertically pivotable about an axis P. The upper hood 17 may be opened and closed through pivotal movement about the axis P when carrying out a simple maintenance operation such as refilling engine oil or changing spark plugs.

The engine room may be fully opened by removing the entire hood 12 after undoing the bolts 20, 21 and 22 and forwardly drawing the lower hood 16. This enables a major operation such as servicing of lower parts of the engine, or removal of the engine.

The upper hood 17 has lower edges thereof surrounding upper edges of the lower hood 16 fixed in position, with spacing S in the order of several millimeters therebetween. This spacing S may be used to allow influx of ambient air. When the engine 6 comprises a vertical type water-cooled diesel engine having a radiator, the spacing S is available as vent for discharging hot air from the engine room along with air flows having passed through the radiator.

A washer 25 for the bolts 24 connecting the hinges 23 to the upper hood 17 is shaped to cover a large area of an inner bottom surface of the headlight box 17d. The washer 25 has a glossy upper surface to act as a reflector for the headlights 18.

FIGS. 10 through 15 show an engine enclosure in a different embodiment of the invention. The engine room defined by the control panel and hood is divided by a partition into an engine accommodating region and an ambient air intake region. The engine enclosure is substantially the same as in the preceding embodiment, and like reference numerals are used to identify like parts which will not be described again to avoid unnecessary repetition.

Figure 10:
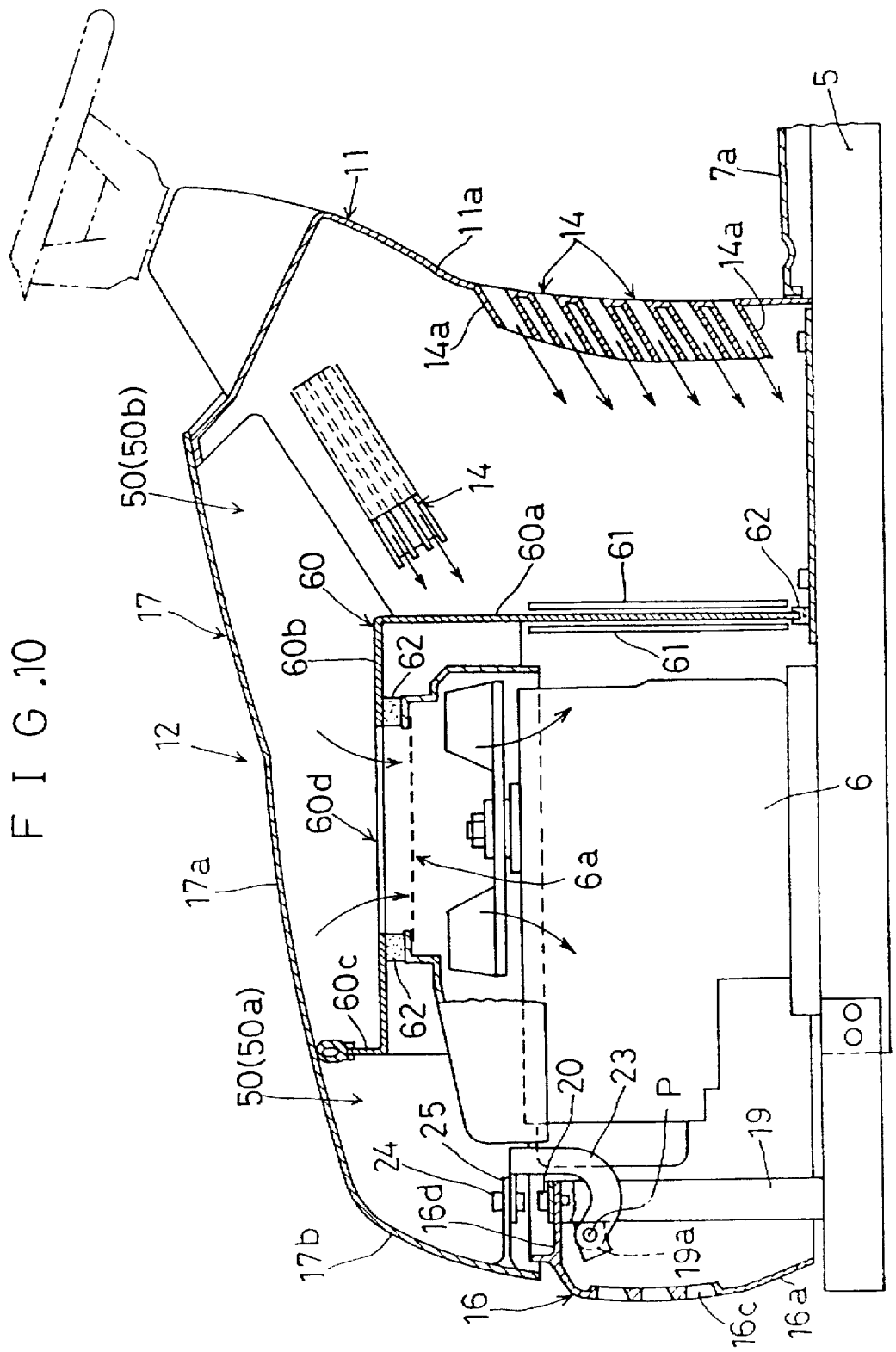
FIG. 10 is a side view in vertical section of a hood in a different embodiment of the invention.
Figure 11:
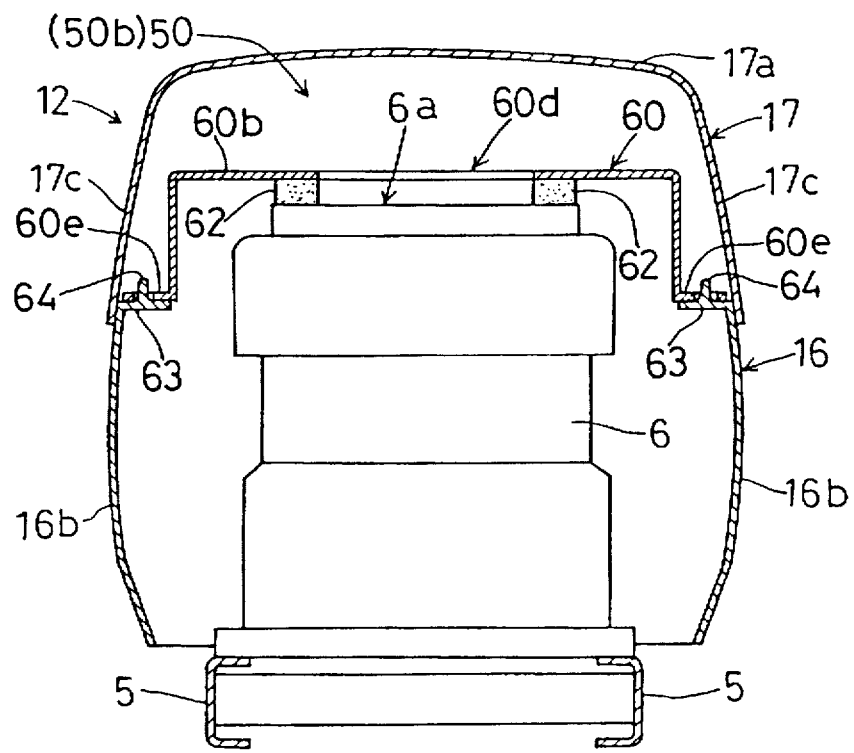
FIG. 11 is a front view in vertical section of the hood in the different embodiment.
Figure 12:
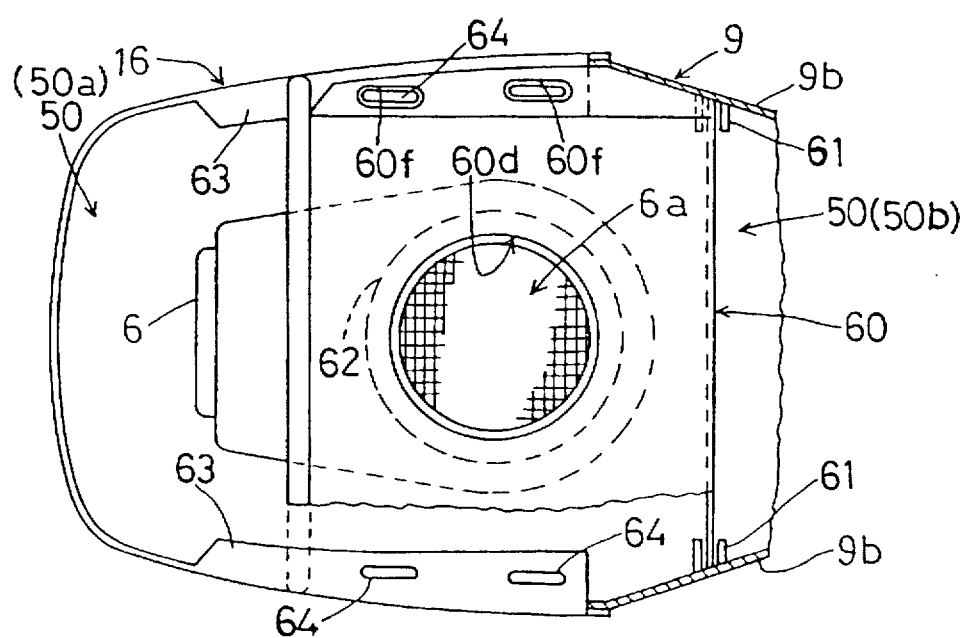
FIG. 12 is a plan view in cross section of the hood in the different embodiment

As shown in FIG. 10, the panel body 11a of the control panel 11 opposed to the step portion 7a has an arcuate shape in plan view, and defines ambient air intake openings 14 in a front region and right and left regions thereof, the air intake openings 14 being inclined forwardly and downwardly. As shown in FIG. 13, the air intake openings 14 formed in the front region of the panel body 11a extend substantially over an entire transverse range of the front region. Inclined guide plates 14a extend forwardly and downwardly from upper and lower edges of the air intake openings 14 to guide air flows in an obliquely downward direction. Thus, incoming engine cooling air through the air intake openings 14 flows forwardly and downwardly, and is then drawn toward an upper portion of the engine. Reinforcing ribs 14b are arranged in appropriate positions between the guide plates 14a.

As shown in FIGS. 14 and 15, the air intake openings 14 formed in the right and left side regions of the panel body 11a are in the form of slits arranged vertically. Surfaces 14c disposed in deep ends of the slits extend forwardly and inwardly, i.e. in the fore and aft direction of the vehicle body. Plates 14d are arranged between the slits to guide incoming air to flow forwardly and downwardly.

As shown in FIG. 10, the upper hood 17, lower hood 16 and control panel 11 define an engine room 50. The engine room 50 is divided by a partition wall 60 into an engine accommodating region 50a and an ambient air intake region 50b. The partition wall 60 includes a rear wall portion 60a opposed to a rear surface of the engine 6, an upper wall portion 60b opposed to an upper surface of the engine 6, and a vertical wall portion 60c extending upward from the upper wall portion 60b forwardly of a cooling air suction opening 6a for the engine 6.

The rear wall portion 60a is fitted at transversely opposite ends thereof in vertical guide grooves 61 formed in the right and left side walls 16b of the lower hood 16. The rear wall portion 60a has a sponge element 62 attached to a lower end thereof for contacting a floor.

The upper wall portion 60b defines a circular opening 60d for communicating the air intake region 50b with the cooling air suction opening 6a for the engine 6. A sponge element 62 is attached peripherally of the opening 60d, which is in contact with peripheries of the cooling air suction opening 6a. As seen from FIGS. 11 and 12, the upper wall portion 60b includes second flange portions 60e extending in the fore and aft direction along transversely opposite ends thereof for resting on first flange portions 63 of the lower hood 16. The first flange portions 63 and second flange portions 60e define engaging projections 64 and elongate engaging bores 60f for vertically engaging each other.

The vertical wall portion 60c has such a height that an upper end thereof is pressed by an inner surface of the upper hood 17 when the second flange portions 60e are placed on the first flange portions 63 with the engaging projections 64 vertically engaging the engaging bores 60f. Thus, the vertical wall portion 60c acts to press the second flange portions 60e upon the first flange portions 63.

A way in which the partition wall 60 is attached to the hood 12 will be described now. Initially, the upper hood 17 is kept open, and the transversely opposite ends of the rear wall portion 60a are fitted into the guide grooves 61 of the lower hood 16 from above. The second flange portions 60e of the partition wall 60 are placed on the first flange portions 63 of the lower hood 16, and the engaging projections 64 are inserted into the engaging bores 60f to engage each other. Through this engagement, the partition wall 60 is positioned relative to the lower hood 16. Next, the upper hood 17 is swung downward about the axis P to a closed position. The vertical wall portion 60c is pressed by the inner surface of the upper hood 17 to press the second flange portions 60e upon the first flange portions 63. As a result, the partition wall 60 is reliably fixed to the hood 12.

Thus, the partition wall 60 may be fixed to the hood 12 simply by placing the second flange portions 60e on the first flange portions 63, engaging the engaging projections 64 and engaging bores 60f, and closing the upper hood 17. In this way, the partition wall 60 may be assembled to the hood 12 with ease. For maintenance of the engine 6 or the like, the upper hood 17 is vertically swung about the axis P to an open position, and the engaging projections 64 and engaging bores 60f are disengaged simply by pulling the partition wall 60 upward. Thus, the partition wall 60 may be detached from the lower hood 16 with ease. The removal of the partition wall 60 from the hood 12 is also an easy operation.

When the engine 6 is operated in the assembled state with the partition wall 60 attached to the lower hood 16 and the upper hood 17 closed, ambient air is drawn in through the air intake openings 14 to flow into a space between the upper hood 17 and upper wall portion 60b without mixing with hot air produced around the engine 6 by operation of the engine 6. Only the cool ambient air is drawn through the opening 60d to the cooling air suction opening 6a for the engine 6. Consequently, the hot air is prevented from entering the cooling air suction opening 6a, to allow the engine 6 to be cooled at a low temperature, thereby achieving improved cooling efficiency. For this purpose, the upper hood 17 and lower hood 16 in this embodiment are dimensioned and arranged not to form spacing S therebetween.

The engaging projections 64 may be formed on the lower hood 16, with the engaging bores 60f formed in the upper hood 17.

What is claimed is:

1. An engine enclosure for use on a vehicle having an engine disposed forwardly of a driver's seat, comprising:

a control panel disposed rearwardly of said engine; and hood means disposed forwardly of said control panel for covering said engine, said hood means including:

a lower hood removably attached to vehicle frames through fixing means, and having a lower front wall portion, and lower side wall portions extending upward and opposed to each other across said engine, said lower side wall portions having a smaller distance therebetween in a lower region than in at least an intermediate region, wherein said lower hood is removable from said vehicle by drawing said lower hood in the forward direction of the vehicle; and an upper hood pivotable about pivot means which is attached to a fixed portion of the vehicle and disposed adjacent a forward end thereof so as to surround upper edges of said lower hood, said upper hood including a top wall portion, an upper front wall portion and upper side wall portions, said upper side wall portions having a greater distance therebetween in a lower region than in at least an intermediate region, wherein the upper hood remains attached to the fixed portion of the vehicle when the lower hood has been removed from the vehicle.

2. An engine enclosure as defined in claim 1, further comprising:

means for circulating ambient air to said engine.

3. An engine enclosure for use on a vehicle having an engine disposed forwardly of a driver's seat, comprising:

a control panel disposed rearwardly of said engine; and hood means disposed forwardly of said control panel for covering said engine, said hood means including:

a lower hood attached to vehicle frames through fixing means, wherein said fixing means includes a front fixator and a rear fixator for removably fixing said lower hood to said vehicle frames, said front fixator being attached to a support member erected on front portions of said vehicle frames, said rear fixator being provided on said control panel, said lower hood having a lower front wall portion, and lower side wall portions extending upward and opposed to each other across said engine, said lower side wall portions having a smaller distance therebetween in a lower region than in at least an intermediate region, wherein said lower hood is removable from said vehicle by drawing said lower hood in the forward direction of the vehicle; and an upper hood pivotable about a pivot means, which is attached to a fixed portion of the vehicle and disposed adjacent a forward end thereof so as to surround upper edges of said lower hood, said upper hood including a top wall portion, an upper front wall portion and upper side wall portions, said upper side wall portions having a greater distance therebetween in a lower region than in at least an intermediate region, wherein the upper hood remains attached to the fixed portion of the vehicle when the lower hood has been removed from the vehicle.

4. An engine enclosure as defined in claim 3, wherein said pivot means is attached to said support member.

5. An engine enclosure for use on a vehicle having an engine disposed forwardly of a driver's seat, comprising:

a control panel disposed rearwardly of said engine; and hood means disposed forwardly of said control panel for covering said engine, said hood means including:

a lower hood attached to vehicle frames through fixing means, said lower hood having a lower front wall portion, and lower side wall portions extending upward and opposed to each other across said engine, said lower side wall portions having a smaller distance therebetween in a lower region than in at least an intermediate region, wherein said lower hood is removable from said vehicle by drawing said lower hood in the forward direction of the vehicle; and an upper hood pivotable about a pivot means which is attached to a fixed portion of the vehicle and disposed adjacent a forward end thereof so as to surround upper edges of said lower hood, said upper hood including a top wall portion, an upper front wall portion and upper side wall portions, said upper side wall portions having a greater distance therebetween in a lower region than in at least an intermediate region, wherein air passages are formed between at least portions of lower edges of said upper hood and upper edges of said lower hood when said upper hood is pivoted to a position covering said upper edges of said lower hood, wherein the upper hood remains attached to the fixed portion of the vehicle when the lower hood has been removed from the vehicle.

6. An engine enclosure for use on a vehicle having an engine disposed forwardly of a driver's seat, comprising:

a control panel disposed rearwardly of said engine, said control panel defining air passing slits and inclined guides for forwardly and downwardly directing air flowing in through said slits; and hood means disposed forwardly of said control panel for covering said engine, said hood means including:

a lower hood attached to vehicle frames through fixing means, and having a lower front wall portion, and lower side wall portions extending upward and opposed to each other across said engine, wherein said lower hood is removable from said vehicle by drawing said lower hood in the forward direction of the vehicle; and an upper hood pivotable about pivot means which is attached to a fixed portion of the vehicle and disposed adjacent a forward end thereof so as to surround upper edges of said lower hood, said upper hood including a top wall portion, an upper front wall portion and upper side wall portions;

wherein air passages are formed between at least portions of lower edges of said upper hood and upper edges of said lower hood when said upper hood is pivoted to a position covering said upper edges of said lower hood, wherein the upper hood remains attached to the fixed portion of the vehicle when the lower hood has been removed from the vehicle.

7. An engine enclosure as defined in claim 6, wherein said fixing means includes front and rear connectors for removably fixing said lower hood to said vehicle frames.

8. An engine enclosure as defined in claim 7, wherein said front connector is attached to a support member erected on front portions of said vehicle frames, and said rear connector is provided on said control panel.

9. An engine enclosure as defined in claim 8, wherein said pivot means is attached to said support member.

10. An engine enclosure for use on a vehicle having an engine disposed forwardly of a driver's seat, comprising:

a control panel disposed rearwardly of said engine; and hood means disposed forwardly of said control panel for covering said engine, said hood means including:

a lower hood removably attached to vehicle frames through fixing means, and having a lower front wall portion, and lower side wall portions extending upward and opposed to each other across said engine, wherein said lower hood is removable from said vehicle by drawing said lower hood in the forward direction of the vehicle; and an upper hood pivotable about pivot means which is attached to a fixed portion of the vehicle and disposed adjacent a forward end thereof so as to surround upper edges of said lower hood, said upper hood including a top wall portion, an upper front wall portion and upper side wall portions, wherein the upper hood remains attached to the fixed portion of the vehicle when the lower hood has been removed from the vehicle.

11. An engine enclosure as defined in claim 10, wherein said upper side wall portions of said upper hood having a greater distance therebetween in a lower region than in at least an intermediate region.

12. An engine enclosure for use on a vehicle having an engine disposed forwardly of a driver's seat, comprising:

a control panel disposed rearwardly of said engine; and hood means disposed forwardly of said control panel for covering said engine, said hood means including:

a lower hood attached to vehicle frames through fixing means, and having a lower front wall portion, and lower side wall portions extending upward and opposed to each other across said engine, wherein said lower hood is removable from said vehicle by drawing said lower hood in the forward direction of the vehicle; and an upper hood pivotable about pivot means which is attached to a fixed portion of the vehicle and disposed adjacent a forward end thereof so as to surround upper edges of said lower hood, said upper hood including a top wall portion, an upper front wall portion and upper side wall portions wherein said pivot means having a pivot axis extending in a lateral direction of the vehicle and the upper hood remains attached to the fixed portion of the vehicle when the lower hood has been removed from the vehicle.

13. An engine enclosure as defined in claim 12, wherein said lower side wall portions of said lower hood having a smaller distance therebetween in a lower region than in at least an intermediate region and said upper side wall portions of said upper hood having a greater distance therebetween in a lower region than in at least an intermediate region.

* * * * *